UNITED STATES PATENT OFFICE 2,043,204

LAXATIVE COMPOSITION

Clarence G. Spalding, Milford, Conn., assignor of one-half to George R. Gould, New Haven, Conn.

No Drawing. Application February 20, 1934, Serial No. 712,136

4 Claims. (Cl. 167—56)

This invention relates to new laxative compositions, and particularly to laxative compositions which are free from the objections of the common laxative preparations or which have improved properties for laxative purposes.

Many substances have been proposed and used as laxatives, cathartics, aperients and purgatives, including drugs of various kinds, saline solutions, etc. Cereal bran has been used to some extent, but its extensive use is recognized to have distinct objections. Psyllium seeds have been used as bulk-giving material and for their laxative action, but there are certain limitations and objections to their continued use. Mineral oils are used for their lubricating properties, but they tend to interfere with the normal digestion of food in the intestinal tract and may serve to coat the intestinal membrane in an objectionable manner. Agar agar has been used as a bulk-giving material, but it is a well known material for use as a culture medium in growing bacteria and its use apparently promotes bacterial growths in the intestinal tract.

The present invention provides an improved laxative composition which overcomes or minimizes the objections to prior laxative preparations, and which provides a natural action which is desirable.

The new laxative compositions have as their main constituent fruit pectin, together with one or more ingredients which inhibit the dissolving or swelling action of the pectin. The new compositions contain a sufficient proportion of pectin so that an effective laxitive action is obtained with an ordinary dose.

I have found that the active principal of fruits which gives to fruits their laxative action is apparently their pectin content. It is commonly considered that fruits owe their laxative action to their acid content or to their content of salts of fruit acids, but I have found that it is the pectin content of the fruits which largely or mainly gives to them their laxative action.

Pectin is readily extracted from fruits of various kinds, and, in different forms, is on the market as an article of commerce. Its main field of use is in the manufacture of jellies. It has such pronounced jelling properties that only around one half of one per cent. of pectin is commonly used, together with a large amount of sugar, and fruit acids, in making jelly, the jelly containing, for example, around 65% of sugar, around one half of one percent. pectin, a small percentage of fruit acids, and the remainder mainly water or fruit juices. In such jellies the amount of pectin is so small that the amount of jelly which would ordinarily be eaten would have little if any laxative action.

But I have found that when pectin is taken in sufficiently large amounts, for example, in amounts of around 25 to 30 grains per dose, the pectin forms a most valuable material for giving bulk to the contents of the intestines, keeping the contents of the intestines in a desirable moist condition, and promoting normal peristaltic action and evacuation.

Pectin, however, cannot be readily taken in its dry powdered state. It readily swells in contact with water or with the secretions of the mouth to form a treacle-like or mucilage-like mass. It forms a satisfactory mucilage with good adhesive properties in water solutions containing only around 3 to 6% of pectin.

I have found that the difficulties in the administration of pectin in sufficient amounts to secure the desired laxative effect, can be overcome by using the pectin in a dry state and combining therewith a substance or substances which inhibit the dissolving and swelling tendency of the pectin, thereby making it possible to administer a sufficiently large amount of pectin through the mouth while avoiding the objections of present pectin preparations.

The suitable compounding of an inhibitor of the dissolving or swelling of the pectin with the pectin, enables the composition to be readily taken through the mouth without objectionable sticking in the mouth, or enables the composition to be added to a small amount of water without objectionable swelling and dissolving therein to form a suspension which can readily be swallowed without objection.

Various substances can be used as inhibitors of the dissolving or swelling of the pectin. Small amounts of natural gums such as gum acacia and particularly karaya gum, when properly compounded with the pectin, sufficiently retard its dissolving or swelling so that it can be readily administered. Substances which provide the pectin with a coating and prevent it from coming in contact with the secretions of the mouth, and therefore prevent wetting of the pectin can be employed. The inhibitor should be incorporated with the pectin in a sufficiently intimate manner, as by coating the particles of pectin with the inhibiting material, which can be readily accomplished, for example, by adding a solution of the inhibiting gum in a volatile solvent to the pectin, stirring the mixture to granulate, and then evaporating the solvent.

The following examples illustrate compositions in which gums such as karaya gum and gum acacia are used as the inhibitors.

*Example I.*—An intimate mixture is made of finely powdered pectin and karaya gum in the proportions of about 14 parts by weight of pectin and 3 parts by weight of karaya gum. This mixture is moistened with a mixture of alcohol in water containing about two-thirds by volume of 95% alcohol and one-third water, and the mixture is permitted to stand long enough for some of the karaya gum to dissolve and coat the particles of pectin. The liquid is then evaporated and the mixture granulated to form granules which apparently contain a coating of the karaya gum around the particles of pectin, or contain the fine particles of pectin so embedded in or admixed with the karaya gum as to inhibit the dissolving or swelling of the pectin when added to water or when taken in the mouth.

*Example II.*—A similar mixture is made of about 14 parts of fine powdered pectin, about 3 parts of gum acacia and about 17 parts of fine powdered sugar and this mixture is similarly moistened with a mixture of alcohol and water, the liquid evaporated and the product formed into granules. In this case the gum acacia acts as an inhibitor to prevent or retard the swelling or dissolving of the pectin when it is added to water or taken in the mouth.

The inhibitor used with the pectin may for some purposes advantageously take the form of an enteric coating for the particles of the pectin, so that the pectin will be protected not only while it is being taken through the mouth, but also during its passage through the stomach, and so that its swelling and dissolving action will largely or entirely take place when it reaches the small intestines. While various enteric coatings can be used, a description of the following example, using stearic acid, will illustrate this method of administration and this method of embodying the invention.

*Example III.*—The pectin powder is admixed with a solution of stearic acid dissolved in volatile solvents such as ether and with the use of an amount of the solution depending upon the size of the particles of the pectin, so that the pectin will be completely surrounded with the stearic acid solution, and so that, on evaporation of the solvent, the stearic acid will form a protective coating around the pectin particles. The mixture may be formed into granules. When taken through the mouth the stearic acid will protect the pectin from coming in contact with the secretions of the mouth, and, when the pectin enters and passes through the stomach, the stearic acid will similarly protect the pectin from dissolving or swelling in the stomach. But when the composition reaches the small intestines, the alkaline digestive fluids, acting upon the stearic acid, will free the pectin so that it can exert the desired swelling and bulk-giving properties.

Other fats or oils, such as cocoa butter or other glycerides, will serve to protect the pectin from contact with the fluids of the mouth, when the pectin is coated with such fatty materials, but will not protect it in the stomach because such fats will be there decomposed or digested to a greater or less extent, although, to the extent that they may not be digested or decomposed in the stomach, they may serve to protect the pectin to a greater or less extent from swelling in the stomach. However, the dissolving or swelling of the pectin in the stomach is not objectionable, since the amount of the pectin, although quite adequate for the desired laxative effect, is not objectionable and may even be desirable in aiding digestion by keeping the contents of the stomach of a desirable consistency, and by giving added bulk and a somewhat increased consistency where the contents of the stomach would otherwise be in a more liquid state.

A pectin composition in which the particles of pectin are admixed with and coated by an edible oil or fat or fatty acid is a valuable composition not only for use as such as a laxative composition, but also for incorporating pectin with other materials such as dough batches and the like, in which water or aqueous liquids are also used, and for protecting the pectin from contact with and dissolving or swelling in such aqueous liquids.

I do not in this application, claim the method of incorporating pectin in dough batches and the like by coating the pectin with an edible oil or fat or fatty acid, or the dough batches, or bakery products produced therefrom, in which such pectin is incorporated, as these are described and claimed in my copending application, Serial No. 78,073 filed May 6, 1936.

Pectin is made commercially from different fruits and is prepared in a dry state in various forms. It differs somewhat in its composition, depending upon the fruit from which it is extracted, the condition of the fruit at the time of extraction, the method employed, etc. With such different pectins, the amount required for the proper laxative dose will vary somewhat, but in general, with the pectin I have used, I have found that around 25 to 35 grains of pectin provided an adequate dose.

As compared with a material like agar agar which readily supports bacterial growth, pectin has the advantage that it does not provide a medium for bacterial growth, thus presenting important advantages in this respect over a material like agar agar.

Some commercial pectin preparations have sugars of various kinds intimately admixed with them. Some of these sugars, if carried into the intestines along with the pectin, may tend to cause gas formation, and, in such cases, the admixed sugar should be omitted.

I have found that pectin compositions, in which an adequate dose of pectin can be provided in a form in which it can be administered without objection, provide what is in many respects an ideal laxative composition, imparting to the contents of the intestines a desirable bulk and moisture retaining properties without interfering with the proper digestive functioning of the intestinal tract. The new composition of the present invention enables this desirable result to be obtained, and an adequate dosage of pectin to be administered without excessive dilution of the pectin, and also without the objections incident to the use of the pectin itself in an uncompounded state.

While the use of pectin alone, suitably compounded to permit its ready administration, is adequate or sufficient in most if not all cases, there are instances where a more pronounced action is required, as by the administration of one of the common laxative drugs, such as phenolphthalein, cascara, etc. in addition to the pectin. This can readily be accomplished by adding a small amount of phenolphthalein, cascara, or other laxative drugs to the pectin, and, where the inhibitor is subsequently added, after the laxative drug has been intimately combined with the pectin, it may inhibit not only the dissolving or swelling of the pectin in the mouth, but also the dissolving of the added drug, in case that is soluble in water. For example, there may be added to the granular preparations of Examples I and II an amount of phenolphthalein which will provide 1 grain of phenolphthalein for each 30 grains of pectin; or 2 grains of cascara compound to 30 grains of pectin; which added drugs may be intimately admixed with the pectin before the inhibitor is added. Similarly, where an enteric coating, such as stearic acid, is added to coat the particles of pectin, the prior incorporation of the laxative drug, such as phenolphthalein, cascara, etc., with the pectin, followed by the coating of the thus treated pectin with the stearic acid, insures an effective laxative action by combining the bulk producing and water retaining properties of the pectin with the active stimulating action of the added drug. With such a composite product, the amount of the added drug, such as phenolphthalein, cascara, etc., can be greatly reduced as compared with the amount which would be required for a laxative dose of the drug, used by itself; and the amount of pectin can also be materially reduced from the dose which might be desirable in the absence of the added laxative drug.

In the foregoing examples, I have described the use of dry powdered pectin and its compounding with the inhibiting material. Dry powdered pectin is commonly prepared from aqueous solutions, for example, by spray drying, or by precipitation with alcohol or a salt, and drying of the precipitate, etc. The inhibiting material or materials are readily compounded with the pectin by adding them to the pectin solution before the pectin is prepared in a dry state, for example, by adding a small proportion of an inhibiting gum such as karaya gum to the pectin solution followed by spray drying of the composite solution to give a composite pectin-karaya gum composition containing sufficient karaya gum to exert the desired inhibiting action on the dissolving or swelling of the pectin.

It will thus be seen that the present invention provides a new and improved composition with properties which distinguish it from common dry pectin preparations intended for jelly making and similar purposes. The rapid dissolving of the pectin in such compositions is a primary object. In contrast with such preparations, I add to and incorporate with the pectin an inhibitor of the dossolving or swelling of the pectin, thereby inhibiting the very properties which are desirable in jelly making preparations, and enabling the pectin to be readily administered in sufficiently large amounts for an adequate laxative dose with only a limited amount of the added inhibitor or other ingredients.

I claim:

1. A composition for increasing peristaltic action, comprising finely divided, dry, solid pectin in an amount sufficient, in a readily administered portion, to promote peristaltic action, the individual particles of the pectin being coated with an inhibitor which inhibits dissolving or swelling of the pectin in contact with the secretions of the mouth or other aqueous liquids.

2. A composition for increasing peristaltic action, comprising finely divided, dry, solid pectin in an amount sufficient, in a readily administered portion, to promote peristaltic action, the individual particles of the pectin being coated with a water-resistant, oily or fatty material which inhibits dissolving or swelling of the pectin in contact with the secretions of the mouth or other aqueous liquids.

3. A composition for increasing peristaltic action, comprising finely divided, dry, solid pectin in an amount sufficient, in a readily administered portion, to promote peristaltic action, the individual particles of pectin having a coating of a gum which inhibits the dissolving and swelling of the pectin when in contact with the secretions of the mouth or other aqueous liquids.

4. A composition for increasing peristaltic action, comprising finely divided, dry, solid pectin in an amount sufficient, in a readily administered portion, to promote peristaltic action, the individual particles of the pectin being coated with stearic acid which inhibits the dissolving or swelling of the pectin in contact with the secretions of the mouth or other aqueous liquids.

CLARENCE G. SPALDING.